United States Patent
Redding

[19]

[11] Patent Number: 5,826,788
[45] Date of Patent: Oct. 27, 1998

[54] HANDLE ASSEMBLY FOR ROTATABLE STEM

[75] Inventor: John C. Redding, Oostburg, Wis.

[73] Assignee: Kohler Co., Kohler, Wis.

[21] Appl. No.: 591,067

[22] Filed: Jan. 25, 1996

[51] Int. Cl.$^6$ .................................................. F16K 35/00
[52] U.S. Cl. ........................... 251/355; 137/359; 251/292
[58] Field of Search ............................ 137/359; 251/291, 251/292, 355

[56] References Cited

U.S. PATENT DOCUMENTS

| | | | |
|---|---|---|---|
| 351,828 | 11/1886 | Bushnell . | |
| 702,131 | 6/1902 | Green, Jr. | 251/292 |
| 1,483,903 | 2/1924 | Masury . | |
| 1,484,350 | 2/1924 | Cusick . | |
| 1,654,550 | 1/1928 | Muend | 137/359 |
| 1,990,197 | 2/1935 | Mohr | 251/292 |
| 2,744,720 | 5/1956 | Wilms | 251/161 |
| 2,842,336 | 9/1958 | Johnson | 251/330 |
| 3,026,898 | 3/1962 | Weller | 137/359 |
| 3,048,362 | 8/1962 | Scarborough | 251/214 |
| 3,318,642 | 5/1967 | Peterson | 308/26 |
| 3,567,176 | 3/1971 | Johnson | 251/174 |
| 3,807,455 | 4/1974 | Farrell | 137/625.31 |
| 3,847,181 | 11/1974 | Scheiwer | 137/359 |
| 4,183,500 | 1/1980 | Nightingale | 251/335 R |
| 4,340,204 | 7/1982 | Herd | 251/327 |
| 4,479,670 | 10/1984 | Gabler | 251/328 |
| 4,651,770 | 3/1987 | Denham et al. | 137/270 |
| 4,764,035 | 8/1988 | Boyd | 384/152 |
| 4,821,765 | 4/1989 | Iqbal et al. | 137/270 |

OTHER PUBLICATIONS

Drawing No. 58600–AA and Photograph of the Kohler Revival Handle, admitted 1995.

*Primary Examiner*—A. Michael Chambers
*Attorney, Agent, or Firm*—Quarles & Brady

[57] ABSTRACT

A handle assembly for a rotating shaft which reduces shaft wobble. The handle assembly has a bearing in the form of a split ring which is arcuate in cross section to provide a reduced friction when the bearing is placed between the shaft and a housing axial bore. The handle assembly is employed to engage and rotate the stem of a valve. In a preferred manner, the bearing affords a cavity for a shaft lubricant.

5 Claims, 1 Drawing Sheet

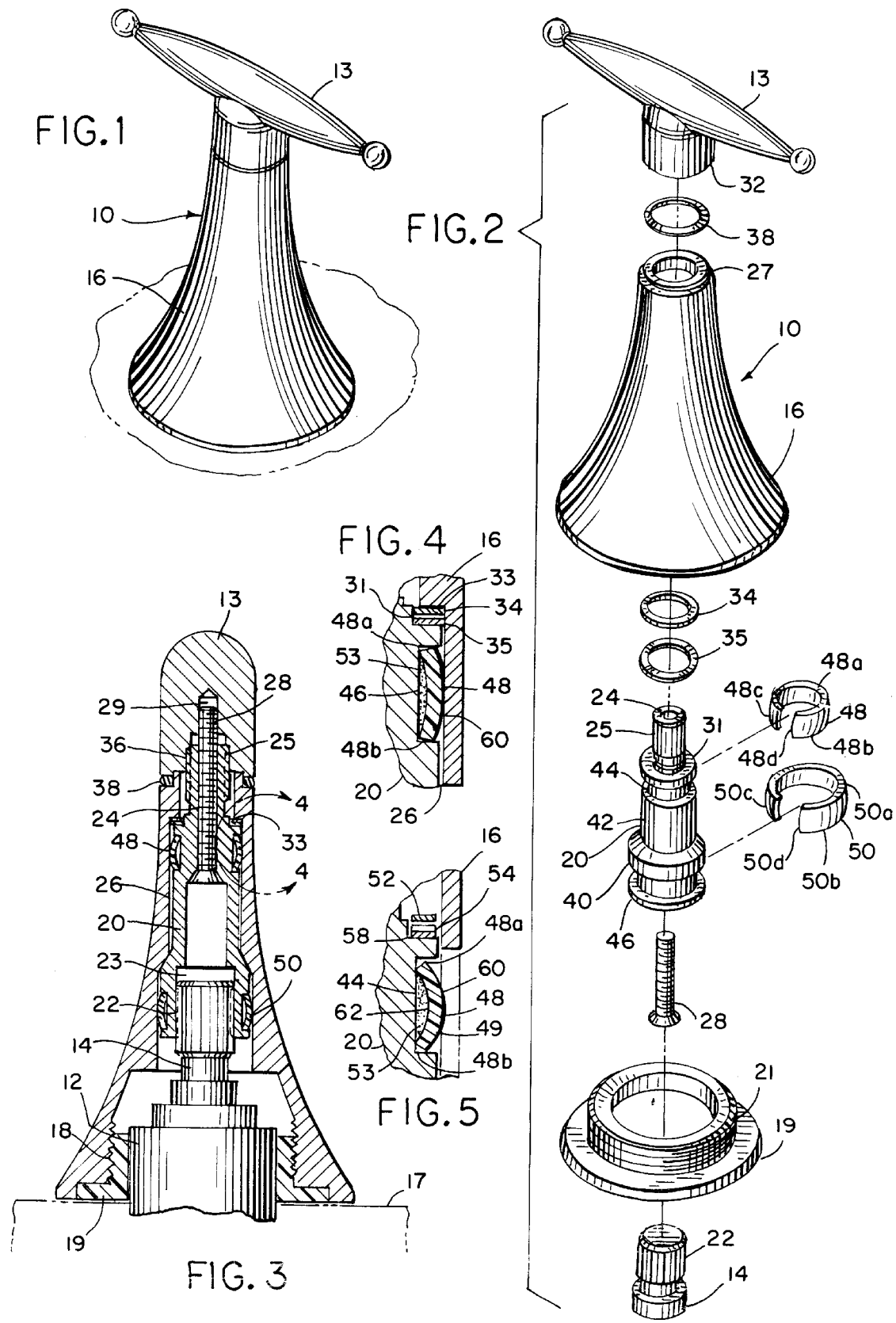

HANDLE ASSEMBLY FOR ROTATABLE STEM

BACKGROUND OF THE INVENTION

A. Field of the Invention

The invention primarily relates to fluid valves operated by rotatable stems, and handles for use thereof.

B. Description of the Art

It is well known in the art to provide handle assemblies which can engage the valve stem of a faucet. The handle assembly affords a handle to turn the valve stem as well as a decorative fixture. One such handle assembly includes a bonnet. A rotatable valve stem drive is rotatably mounted in the bonnet for connection to the valve stem. A handle is connected to the valve stem drive for rotating the valve stem drive and thus the valve stem.

A problem with the previously described prior handle assembly is handle wobble caused by the rotation of the valve stem drive in the bonnet. O-rings have been employed between with the outer surface of the valve stem drive and the inner surface of the bonnet, but do not solve the wobble problem.

Another problem in the art is reducing friction between the valve stem drive and the bore of the bonnet. O-rings alone are inadequate bearings for this purpose. While U.S. Pat. No. 4,651,770 also discloses using a lubricant between two O-rings on a valve spindle, it is desirable to have an improved lubrication system to reduce friction.

Thus, it can be seen that a need exists for an improved handle assembly.

SUMMARY OF THE INVENTION

In one aspect, the invention provides a handle assembly for use in turning a rotatable stem which includes a bonnet having an axial bore and a stem drive member rotatably mounted in the axial bore of the bonnet. A handle is connected to the stem drive member for rotating the drive member and the stem. At least one compartment is formed on a radially outward surface of the stem drive member and a bearing is positioned in the compartment for contact with the drive member and an interior surface of the bonnet. The bearing is a C-clip that is arcuate in vertical cross section such that the clip is radially compressed.

In another aspect, the assembly has two of the previously described bearings and compartments provided on the valve stem drive member in a spaced apart manner.

In yet another aspect, a lubricant is placed between the C-clip and drive member.

In yet still another aspect, the bearing is composed of a plastic material.

In still another aspect, a thrust washer is placed between the bonnet and the valve stem drive.

The objects of the invention therefore include:

a. providing a handle assembly of the above kind which affords smooth handle movement;

b. providing a handle assembly of the above kind which reduces wobble of the handle;

c. providing a handle assembly of the above kind wherein the configuration of the bearing provides a cavity for a lubricant;

d. providing a handle assembly of the above kind wherein the need for close tolerances for the bearing is obviated; and e. providing a handle assembly of the kind which is easy to assemble.

These and still other objects and advantages of the invention will be apparent from the description which follows. In the detailed description below, a preferred embodiment of the invention will be described in reference to the accompanying drawings. This embodiment does not represent the full scope of the invention. Rather the invention may be employed in other embodiments. Reference should therefore be made to the claims herein for interpreting the breadth of the invention.

BRIEF DESCRIPTION OF THE DRAWINGS

FIG. 1 is a perspective view of the handle assembly constituting a preferred embodiment of the invention;

FIG. 2 is an exploded view of the handle assembly parts for the handle assembly shown in FIG. 1;

FIG. 3 is a view in vertical section of the assembly shown in FIG. 1 with the assembly being mounted to a faucet housing and on a support;

FIG. 4 is a sectional view taken along line 4—4 of FIG. 3; and

FIG. 5 is a view similar to FIG. 4 showing the valve in a preassembled condition.

DESCRIPTION OF THE PREFERRED EMBODIMENT

Referring to FIGS. 1, 2 and 3, the handle assembly generally 10 has a handle portion 13 and a bonnet portion 16. There are internal threads 18 on the bonnet portion 16 for engagement with external threads 21 on a mounting ring 19 which seats on a support 17. A valve stem drive member 20 is positioned in a bore 26 of the bonnet portion 16. The valve stem drive member has a cavity 23 which receives the spline 22 of the valve stem 14 of the faucet valve 12 which has the usual internal valve parts for controlling the flow of water in response to the turning of the valve stem 14.

The stem drive member 20 has a splined end 25 for seating in cavity 36 of the handle portion 13. It is retained in the bore 26 of the bonnet portion 16 and attached to the handle portion 13 by the screw 28 which engages the threaded passage 29 in the handle portion 13. The screw 28 extends through the bore 24 of the stem drive member 20 to sandwich the washer 38 between the bonnet portion 16 and the collar 32 of the handle portion 13 while seated on the shoulder 27 of the bonnet portion 16. Also, there are the washer 34 and the thrust washer 35 which are sandwiched between the shoulder 31 of the stem drive member 20 and the shoulder 33 of the bonnet portion 16.

As best seen in FIGS. 2, 4 and 5, there are the bearings 48 and 50 which snap fit into the compartments 44 and 46 in the small and large diameter portions 42 and 40, respectively, of the stem drive member 20. The bearings 48 and 50 are of an essentially annular configuration having upper and lower end surfaces 48a, 48b, 50a and 50b, respectively. They also have additional end surfaces 48c, 48d and 50c, 50d to provide a split ring type, "C" configuration with the axis of the end surfaces intersecting the upper and lower end surfaces. These bearings 48 and 50 provide low friction stability for the stem drive member 20 as it is turned in the stationary bore 26 of the bonnet portion 16 by the handle portion 13.

While it is known to provide O-rings in compartments of a valve stem for low friction guidance and turning of a valve stem in a bore, the bearings 48 and 50 as presented wherein offer a unique advantage. Due to their configuration and when positioned between valve stem drive member 20 and the inside of the bonnet portion 16 they are not compressed in the same manner or as occurs when an O-ring is pressed against two opposing surfaces. Instead, what is afforded is an axial extension or bending of the bearings 48 and 50. This is seen in comparing the configuration of the bearing 48 in FIGS. 4 and 5. FIG. 5 represents a pre-assembled showing of the valve stem drive member 20 before it is seated in bore 26. FIG. 4 shows the condition of bearing 48 when the valve stem drive 20 is seated in the bore 26. When the position of surfaces 48*a* and 48*b* of bearing 48 in FIG. 5 is compared with their position in FIG. 4, it is seen that they have moved axially in FIG. 4. This movement is effected by the curved configuration of the bearing 48 which has a convex surface such as shown at 60 on the outside and a concave surface 62 on the inside. The axial movement is also assisted by the fact that the wall 49 of the bearing 48 has a uniform thickness between the end surfaces 48*a* and 48*b*. This convex-concave relationship affords two additional advantages. First, the convex surface 60 affords a minimum point of contact of the bearing 48 with the bonnet bore 26 as seen in FIG. 4. Second, the concave surface 62 affords in combination with the compartment 46 a cavity for a lubricant 53.

It will therefore be appreciated that an efficient bearing can be provided for a handle assembly which reduces friction and prevents handle wobble after long periods of use. While reducing friction to a minimum the bearings 48 and 50 also afford a cavity for the placement of a lubricant. The bearings are easy to assemble and do not require close tolerances. This is afforded in part by the fact that it has a split ring configuration with the open ends such as 48*c*, 48*d* and 50*c*, 50*d*.

Thus, the invention provides an improved handle bearing assembly. While a preferred embodiment has been described above, it should be fairly apparent to those skilled in the art that other modifications and changes may be made without departing from the spirit and scope of the invention. For example, while a plumbing valve has been shown for use with the handle assembly, the bearing could be used in conjunction with other types of valves where a low frictional valve turning is desired. While two bearings have been utilized in conjunction with the valve stem receiver, it could be appreciated that a single bearing could be employed although it would not be as efficient in preventing handle wobble. Neither is it necessary that the bushings be of different sizes. If desired they could be of the same size with two or more being utilized. While a lubricant has been advantageously employed in conjunction with the bearing, this could be eliminated. In its place a self lubricating plastic material containing a lubricant such as silicone could be utilized. However, this could add to the cost. All such and other modifications within the spirit of the invention are meant to be within its scope.

What is claimed is:

1. A handle assembly for use in turning a rotatable stem, comprising:
   a bonnet having an axial bore;
   a stem drive member rotatably mounted in the axial bore of the bonnet;
   a handle connected to the stem drive member for rotating the stem drive member and thus the stem;
   at least one compartment formed on a radially outward surface of the stem drive member; and
   a bearing positioned in the compartment for contact with both the drive member and an interior surface of the bonnet, the bearing being a C-clip that is arcuate in vertical cross section such that the clip is radially compressed and axially extended, the bearing defining a cavity between the C-clip and the drive member.

2. The handle assembly of claim 1, wherein there are two of such bearings and two such compartments provided on the stem drive member in a spaced apart manner.

3. The handle assembly of claim 1, wherein a lubricant is placed in the cavity.

4. The handle assembly of claim 1, wherein the bearing is made of a plastic material.

5. The handle assembly of claim 1, wherein there is also a thrust washer disposed between the bonnet and the valve stem drive member.

\* \* \* \* \*